United States Patent [19]
Cantrell et al.

[11] Patent Number: 5,502,448
[45] Date of Patent: Mar. 26, 1996

[54] METHOD AND MEANS FOR SHORT PULSE INTERFERENCE REJECTION

[75] Inventors: Ben H. Cantrell; Bernard L. Lewis, both of Oxon Hill, Md.

[73] Assignee: The United States of America as reperesented by the Secretary of the Navy, Washington, D.C.

[21] Appl. No.: 329,695

[22] Filed: Aug. 30, 1977

[51] Int. Cl.$^6$ ................................ G01S 3/16; G01S 3/28
[52] U.S. Cl. ..................... 342/381; 342/384; 342/380
[58] Field of Search .......................... 343/18 E, 100 EL, 343/100 CL; 325/323, 371; 342/380, 383, 159, 16, 381, 384

[56] References Cited

U.S. PATENT DOCUMENTS

| | | | |
|---|---|---|---|
| 3,938,153 | 2/1976 | Lewis et al. | 343/100 LE |
| 3,938,154 | 2/1976 | Lewis | 343/100 LE |
| 3,978,483 | 8/1976 | Lewis et al. | 325/371 |
| 4,044,359 | 8/1977 | Applebaum et al. | 343/18 E |

Primary Examiner—Stephen C. Buczinski
Attorney, Agent, or Firm—Thomas E. McDonnell; Edward F. Miles

[57] ABSTRACT

A radar interference circuit which rejects both continuous noise and short-pulse interference signals. A plurality of omni-directional antennas are placed around the main directional radar antenna and connected in differing sets to a plurality of canceller means to each of which the main antenna signal is also connected. The canceller means for each set of three Omnis and the main antenna cancels out the white-noise interference received by that group of antennas. The outputs of the plurality of canceller means are then taken in different sets of two each, subtracted and compared to a threshold signal. If one or more comparator outputs are above the threshold, signifying that the antenna pulse signal is being received through the sidelobes of the antenna patterns, the outputs of these comparators will be a one signal and the OR gate, to which the comparator outputs are fed, will provide an output to blank the radar. Thus, short-pulse signals arriving through the sidelobes of the antenna patterns are rejected as interference signals.

8 Claims, 3 Drawing Sheets

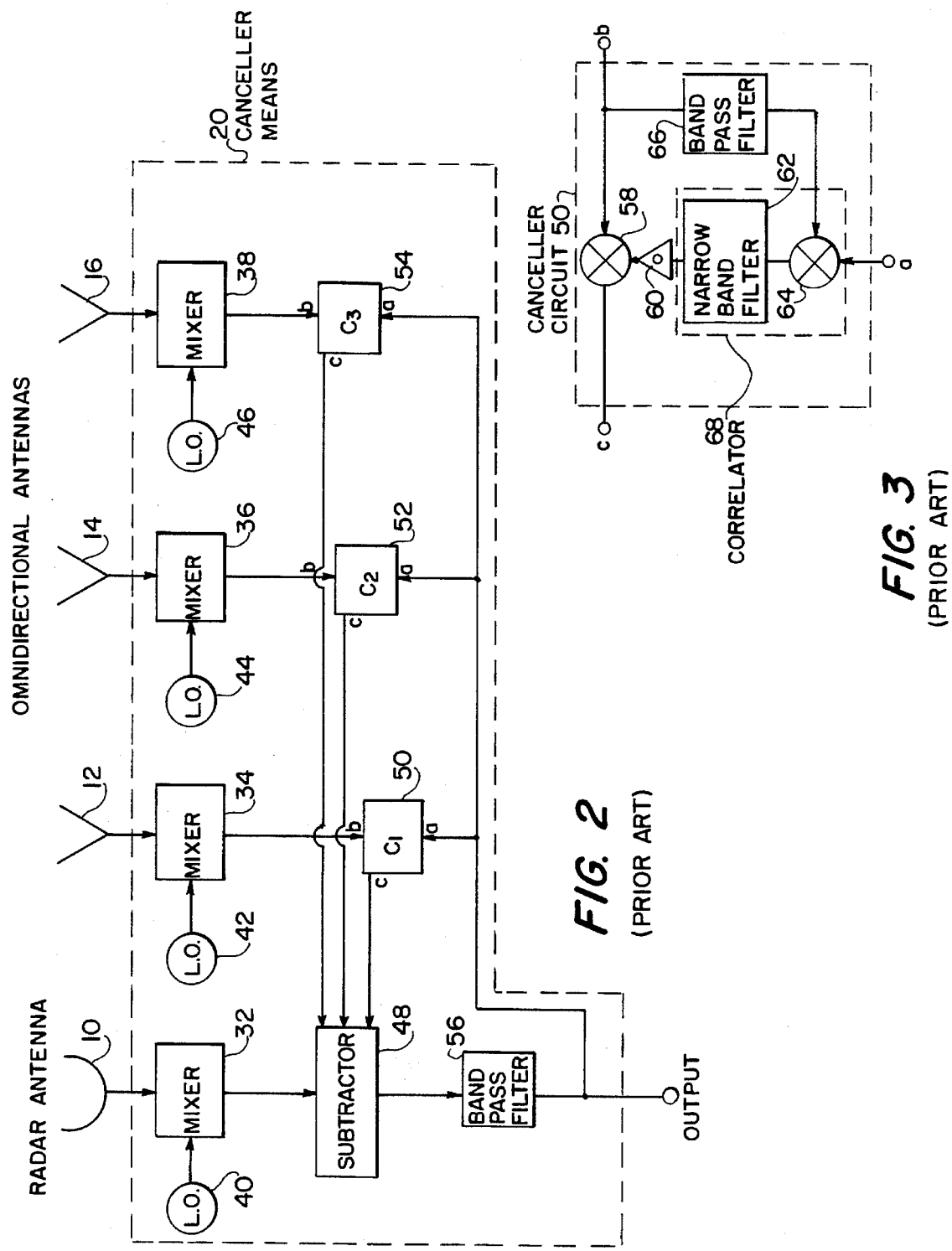

5,502,448

METHOD AND MEANS FOR SHORT PULSE INTERFERENCE REJECTION

BACKGROUND OF THE INVENTION

This invention relates to a method and means for eliminating radar interference signals and especially for eliminating short-pulse interference signals in the presence of continuous-noise jamming signals.

Coherent sidelobe cancellers used with omnidirectional antennas have the capability of aligning a null in the side-lobes of the antenna pattern with the direction from which a noise signal is being received and therefore cancelling out the noise. However, the canceller loops are too sluggish to place nulls in the sidelobe pattern of the antenna in the correct direction in time to cancel out short-pulse interference. Sidelobe blankers can be used to blank the radar when a pulse is received in the sidelobe of the main radar antenna by comparing the signal level in an omnidirectional antenna (hereinafter designated "omniantenna" or simply "Omni") with respect to the amplitude of the pulse in the main radar antenna. But if white-noise continuous jamming is present the radar will be totally blanked. This can be circumvented by placing cancellers in the Omni channel to cancel out the continous interference. This antenna system then becomes an interferometer and nulls may also be placed toward the source of the short-pulse interference. Therefore, the sidelobe blanker will not blank all the short-pulse interference it should.

SUMMARY OF THE INVENTION

An object of this invention is to reject short-pulse interference coming in from the sidelobes of the antenna patterns of a radar receiver in the presence of continuous-noise jamming.

The objects and advantages of the invention are accomplished by arranging a plurality of Omnis to feed a plurality of canceller means in different sets. The main radar antenna also feeds each canceller means which cancells the white-noise jamming signals received by its group of antennas. Each group of antennas has an antenna pattern which has essentially the same main lobe but different sidelobe patterns. Thus, pulse interference received by the sidelobes will be of different strength depending upon which sidelobe is receiving it, i.e., which group of antennas is receiving it. The output strengths of the canceller means will therefore be different for a pulse received on the sidelobes, but the same for a pulse received on the main lobe.

By subtracting the canceller-means' outputs from each other in different groups of two, it can be determined whether the antennas are receiving a signal from the main lobes or the sidelobes of the different antenna patterns and an identification signal produced to indicate this information. The identification signal can then be used to blank or unblank the radar as appropriate.

BRIEF DESCRIPTION OF THE DRAWING

FIG. 2 is a schematic diagram showing a possible circuit that can be used as canceller means in FIG. 1.

FIG. 3 is a schematic diagram of a possible canceller circuit.

DETAILED DESCRIPTION OF THE INVENTION

Figure 1:
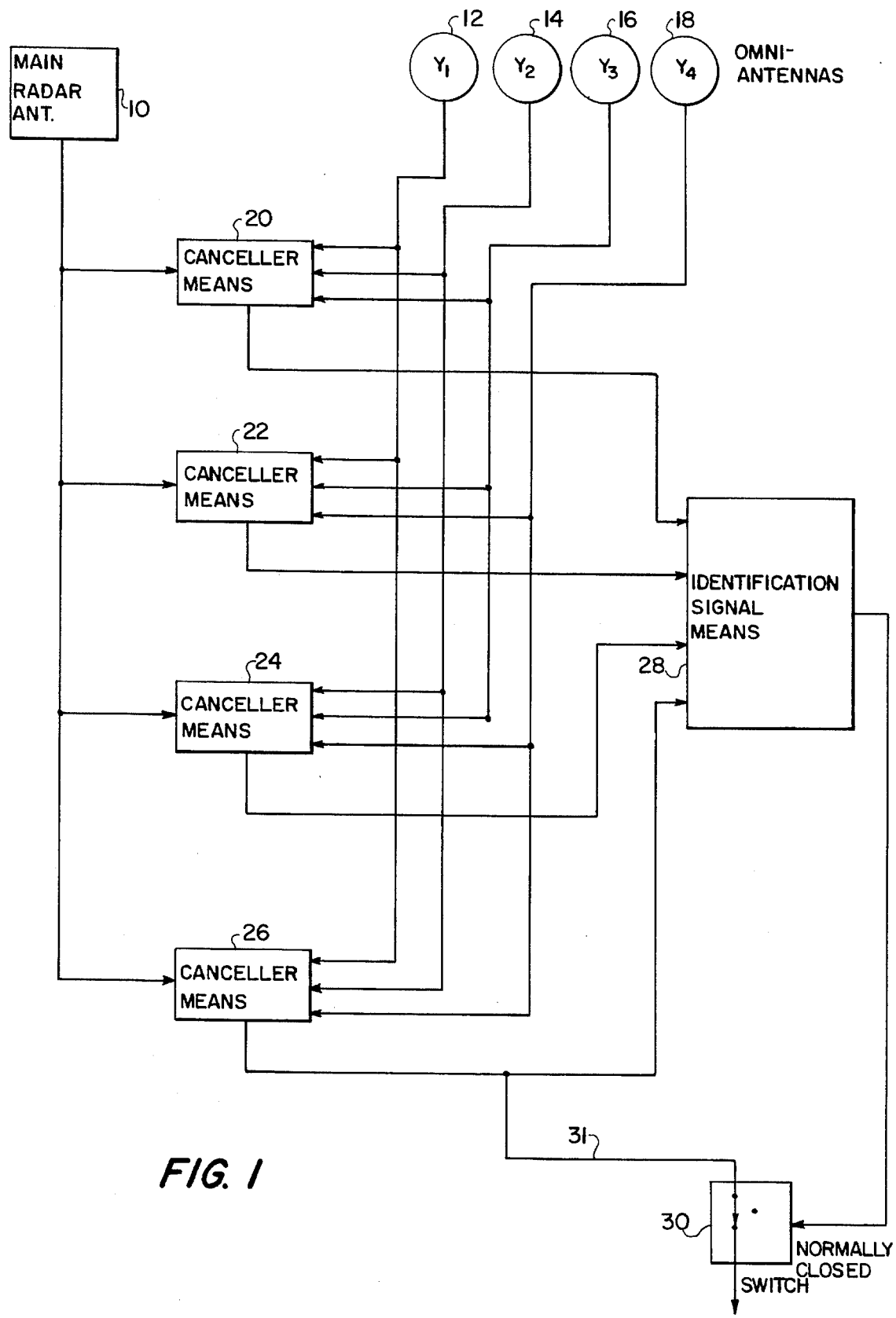
FIG. 1 is a schematic illustration of an embodiment of the invention.

FIG. 1 shows an embodiment of the invention in block form. The embodiment uses a main radar antenna 10 which is directional and four omnidirectional antennas, 12, 14, 16, 18 which are placed around the main antenna 10 in any random pattern.

The signal pattern of the main antenna 10 is the usual type having a high-gain main lobe and a set of lower-gain side-lobes. Each Omni in combination with the main antenna changes the sidelobe pattern of the main antenna but leaves the main lobe essentially the same. The sidelobe pattern of each of the various Omnis in combination with the main antenna will differ from the sidelobe pattern of any other Omni-main antenna pattern.

If a pulse is received by the main lobe, it will appaer in all the combination patterns with essentially the same strength since the main lobes in all of the patterns are substantially the same. However, if a pulse hits the sidelobe patterns, it will be of different strength for each sidelobe pattern since the sidelobe patterns are all different. Therefore, if a pulse is seen Of the same strength in all four patterns, it was received by the main lobe. But if a pulse is of different strengths in the four patterns, or is received by only some of the four patterns, it was received by the sidelobes.

As the number of Omnis is increased, the certainty of sidelobe reception increases. Although only two Omnis are essential, four sidelobe patterns probably provide an optimum compromise between cancellation efficiency and complexity of equipment. The invention will thus be described in terms of four Omnis and four canceller means.

Referring again to FIG. 1, the main radar signal is fed to all four canceller means 20, 22, 24, 26 which contain multiple loop canceller circuits. The Omni signals are fed in groups of three to each canceller means, the groups all being different. Thus, canceller means 20 receives signals from $Y_1$, $Y_2$ and $Y_3$; canceller means 22 from $Y_1$, $Y_3$ and $Y_4$; and so on. This assumes there will be no more than three noise sources. An Omni is necessary for each noise source. Although three Omnis can generate more than three nulls, only three can be placed in specific directions.

The equations the canceller means implement is given by:

$$R - \sum_{i=1}^{4} a_i x_i = 0 \tag{1}$$

where R is the strength of the main antenna signal, $a_i$ are the canceller weights and $x_i$ are the strengths of the Omni signals. The four signals out of the canceller means have the white-noise signals removed. If a pulse is present and has come in through the sidelobes, the four outputs from the canceller means will be different from each other. If the pulse is being received by the main lobe, the four outputs will be substantially the same in strength.

The identification signal means 28 produces an output signal which indicates whether a pulse is being received by the main lobes or the sidelobes of the antenna patterns, i.e., whether the received pulse is not or is to be considered as an interference signal. A "1" output signal is produced when the differences between its four input signals is large. This 1 signal is fed to an electronic switch and activates it (opens it) which prevents the signal on line 31 to pass to the radar processing circuits. This signal is the signal being received by the side lobe of the antenna patterns. The identification signal means produces a "0" output signal when the differences between its four input signals are smaller than a predetermined threshold. The 0 signal does not activate the switch 30.

The 0 and 1 identification signals can also be used as blanking and unblanking signals in other circuits of the radar set as will be apparent to those skilled in the radar art and it will also be apparent that other types of circuits can be used in place of the signal identification means 28.

A circuit which may be used in each of the canceller means is shown in FIG. 2. This is taken from U.S. Pat. No. 3,938,154, issued 10 Feb. 1976, which is incorporated herein by reference and therefore the circuit will not be described herein in detail. Canceller means 20 is illustrated in FIG. 2 and, thus, Omnis $Y_1(12)$, $Y_2(14)$ and $Y_3(16)$ are shown. For the other canceller means, a different combination of Omnis would be used, e.g., $Y_1(12)$, $Y_3(16)$ and $Y_4(18)$ for canceller means 22.

Each canceller means shown automatically provides the correct weighting factors, $a_i$, to implement equation (1) above for its own canceller circuits 50, 52 and 54. Thus, the system adjusts itself automatically to cancel out continuous jamming signals. The calculation of the correct canceller weights may also be done by a computer which solves the equation:

$$w = \overline{(x^T x)}^{-1} \overline{Rx^T} \quad (2)$$

where $x^T$ is the transpose of x and the bar above the factors indicates the time average. Equation (2) is a matrix equation for which solutions are easily worked out by computer.

Figure 4:
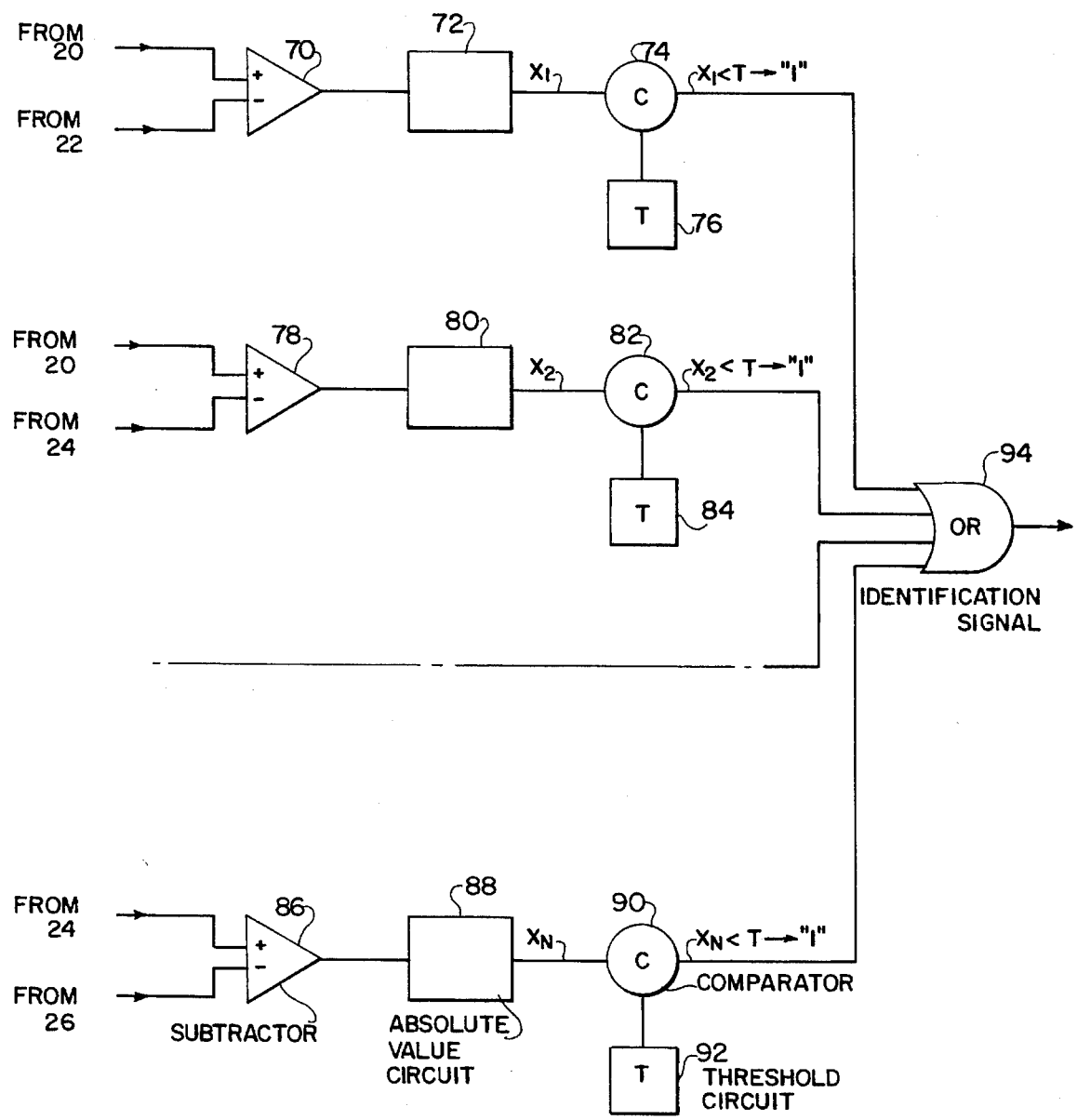
FIG. 4 is a schematic illustration of a circuit which can be used as a blanking means.

FIG. 4 illustrates a circuit which can be used as the identification signal means 28. It comprises a set of parallel arms feeding into an OR gate 94. Each arm is identical and consists of a subtracter 86, a circuit 88 for providing the absolute value of the output of the subtracter and a comparator 90 to which the absolute value signal and a threshold comparison signal is fed. If the absolute value of the difference signal, $x_N$, is less than the value of the threshold signal, T, the comparator generates a "0" output. If all four comparators generate a "0" output, indicating a signal received by the main lobe, and OR gate 94 provides a "0" output, i.e., a pass or unblanking signal, and permits the main lobe signal to be passed to the radar circuits and display means. However, if the absolute value signal is greater than the threshold signal in any arm, its comparator provides an output signal, or a "1" the output of the OR gate 94 is also a one, so that the switch 30 opens.

The inputs to each subtracter are the outputs from a pair of canceller means, each subtracter being connected to the outputs of a different pair of canceller means. With four canceller means, six combinations of two are possible so that there would be six parallel arms. In actual practice, it is probable that fewer combinations could be used with no significant deterioration of results.

Thus, the system described herein first provides cancellation of continuous jamming signals by the canceller means and then operates upon the outputs of the canceller means to provide an identification signal which indicates whether a received pulse signal has been picked up by the sidelobes or the main lobe of the antenna patterns. The identification signal can be used as a blanking or unblanking signal for the radar.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. Radar interference rejection means which rejects continuous noise as well as short-pulse interference signals for use with a radar set having a main directional antenna comprising, in combination:

a plurality of omni-directional receiving antennas (Omnis) arranged around the main antenna;

a plurality of canceller means equal in number to the number of Omnis, the main antenna being coupled to all said canceller means, and the Omnis being coupled to said canceller means in different sets consisting of one less than the total number of Omnis; and identification signal means for subtracting the outputs of said canceller means from each other in sets of two, all said sets being different, determining whether any of the subtracted outputs are substantially different from the other, and providing an identification signal signifying that this condition exists.

2. Radar interference rejection means as in claim 1, wherein said plurality of Omnis is equal to four.

3. Radar interference rejection means as in claim 1, further including means for utilizing the identification signal.

4. Radar interference rejection means as in claim 1, where said identification signal means comprises:

a plurality of parallel circuit arms, each having a subtracter circuit coupled to the outputs of two of said canceller means, each subtracter being coupled to a different set of canceller means, a circuit for providing the absolute value of the output of the subtracter circuit, a threshold circuit for providing a threshold signal of a predetermined strength, and a comparator circuit for comparing the strengths of the absolute value signal and the threshold signal and providing an output signal if the absolute value signal is greater than the threshold signal; and OR gate means to which the outputs of said comparators are coupled for providing an output signal which indicates whether the signal received by the main antenna and Omnis is being received by the main lobes or the sidelobes of the antenna patterns.

5. Radar interference rejection means as in claim 4, wherein said plurality of Omnis is equal to four, and said plurality of parallel circuit arms in said identification signal means is equal to six.

6. Radar interference rejection means as in claim 4, further including:

electronic switch means coupled to receive the output of one of said canceller means as the switched signal, and coupled to receive the identification signal as the switch-actuating signal.

7. A method for deriving a signal to indicate whether a short radar pulse received in the presence of radar continuous noise signals is an interference signal comprising the steps of:

forming different combinational sets from a greater set of omni-directional radar antennas;

combining a directional main radar antenna with said different sets of omni-directional antennas to produce antenna groups having antenna patterns exhibiting substantially the same main lobe but different sidelobes;

coupling the signals received by the antennas in each group to a different canceller means;

subtracting the output signals produced by the canceller means from each other in sets of two and comparing the strengths of the subtracted-signal outputs with each other to determine whether they are different or substantially the same; and deriving an identifying signal indicating whether the subtracted-signal outputs are different or substantially the same.

8. A method for rejecting continuous noise interference as well as short-pulse interference signals in a radar set comprising:

the steps set forth in claim 7; and utilizing said identifying signal to blank said radar when the identifying signal indicates that the pulse is being received by the sidelobe patterns of the antenna groups.

* * * * *